US008711920B1

(12) United States Patent
Sarca

(10) Patent No.: US 8,711,920 B1
(45) Date of Patent: Apr. 29, 2014

(54) SYSTEM AND METHOD FOR MULTI-THREADED OFDM CHANNEL EQUALIZER

(71) Applicant: Redline Communications, Inc., Markham (CA)

(72) Inventor: Octavian Valeriu Sarca, Aurora, CA (US)

(73) Assignee: Redline Communications, Inc., Markham (CA)

( * ) Notice: Subject to any disclaimer, the term of this patent is extended or adjusted under 35 U.S.C. 154(b) by 0 days.

(21) Appl. No.: 14/091,632

(22) Filed: Nov. 27, 2013

(51) Int. Cl.
*H03H 7/30* (2006.01)
*H04K 1/10* (2006.01)

(52) U.S. Cl.
USPC .......................................... 375/232; 375/260

(58) Field of Classification Search
CPC . G06F 9/3885; G06F 9/3836; G06F 9/30079; G06F 9/3826; G06F 9/3875; G06F 7/4806; G06F 9/382; G06F 7/57; G06F 9/3001; H04B 1/0003
USPC ......................................... 375/232, 260, 350
See application file for complete search history.

(56) References Cited

U.S. PATENT DOCUMENTS

| | | | |
|---|---|---|---|
| 2005/0273483 A1* | 12/2005 | Dent | 708/490 |
| 2006/0271765 A1* | 11/2006 | Tell et al. | 712/35 |
| 2009/0106541 A1* | 4/2009 | Mizuno et al. | 712/239 |
| 2010/0293210 A1* | 11/2010 | Sima et al. | 708/209 |
| 2011/0099393 A1* | 4/2011 | Tran | 713/300 |
| 2012/0023313 A1* | 1/2012 | Tashiro et al. | 712/209 |

* cited by examiner

*Primary Examiner* — Don N Vo
(74) *Attorney, Agent, or Firm* — Nixon Peabody LLP

(57) ABSTRACT

A system for an orthogonal frequency division multiplexed (OFDM) equalizer, said system comprising a program memory, a program sequencer and a processing unit connected to each other, wherein the processing unit comprises an input selection unit, an arithmetic logic unit (ALU) and an output selection unit; further wherein the program sequencer schedules the processing of one or more symbol-carrier pairs input to said OFDM equalizer using multiple threads; retrieves, for each of the one or more symbol-carrier pairs, multiple program instructions from said program memory; generates multiple expanded instructions corresponding to said retrieved multiple program instructions; and further wherein said ALU performs said processing of the one or more symbol-carrier pairs using the multiple threads across multiple pipeline stages, wherein said processing comprises said ALU executing one or more arithmetic operations to process said expanded instructions using said multiple threads across the multiple pipeline stages.

30 Claims, 10 Drawing Sheets

| Clock Cycle | Pipeline Stage | | | | | |
|---|---|---|---|---|---|---|
| | 1001 | 1002 | 1003 | 1004 | 1005 | 1006 |
| ⋮ | ⋮ | | | | | |
| 1010-1 | 1040-D41-5 | | | | | |
| | | 1040-D41-5 | | | | |
| | | | 1040-D41-5 | | | |
| 1010-8 | 1040-D48-5 | | | 1040-D41-5 | | |
| 1010-9 | NOP | 1040-D48-5 | | | 1040-D41-5 | |
| | | NOP | 1040-D48-5 | | | 1040-D41-5 |
| | | | NOP | 1040-D48-5 | | |
| 1010-12 | NOP | | | NOP | 1040-D48-5 | |
| 1010-13 | 1041-P1-1 | NOP | | | NOP | 1040-D48-5 |
| 1010-14 | 1041-P2-1 | 1041-P1-1 | NOP | | | NOP |
| | | 1041-P2-1 | 1041-P1-1 | NOP | | |
| | | | 1041-P2-1 | 1041-P1-1 | NOP | |
| 1010-44 | 1041-P8-4 | | | 1041-P2-1 | 1041-P1-1 | NOP |
| 1010-45 | NOP | 1041-P8-4 | | | 1041-P2-1 | 1041-P1-1 |
| 1010-46 | NOP | NOP | 1041-P8-4 | | | 1041-P2-1 |
| 1010-47 | NOP | NOP | NOP | 1041-P8-4 | | |
| 1010-48 | NOP | NOP | NOP | NOP | 1041-P8-4 | |
| 1010-49 | NOP | NOP | NOP | NOP | NOP | 1041-P8-4 |
| 1010-50 | 1041-P8-5 | NOP | NOP | NOP | NOP | NOP |
| 1010-51 | NOP | 1041-P8-5 | NOP | NOP | NOP | NOP |
| 1010-52 | NOP | NOP | 1041-P8-5 | NOP | NOP | NOP |
| 1010-53 | NOP | NOP | NOP | 1041-P8-5 | NOP | NOP |
| 1010-54 | NOP | NOP | NOP | NOP | 1041-P8-5 | NOP |
| 1010-55 | NOP | NOP | NOP | NOP | NOP | 1041-P8-5 |
| 1010-56 | 1041-P8-6 | NOP | NOP | NOP | NOP | NOP |
| 1010-57 | NOP | 1041-P8-6 | NOP | NOP | NOP | NOP |
| 1010-58 | NOP | NOP | 1041-P8-6 | NOP | NOP | NOP |
| 1010-59 | NOP | NOP | NOP | 1041-P8-6 | NOP | NOP |
| 1010-60 | NOP | NOP | NOP | NOP | 1041-P8-6 | NOP |
| 1010-61 | NOP | NOP | NOP | NOP | NOP | 1041-P8-6 |
| 1010-62 | 1041-D1-1 | NOP | NOP | NOP | NOP | NOP |
| 1010-63 | 1041-D2-1 | 1041-D1-1 | NOP | NOP | NOP | NOP |
| 1010-64 | | 1041-D2-1 | 1041-D1-1 | NOP | NOP | NOP |
| 1010-65 | | | 1041-D2-1 | 1041-D1-1 | NOP | NOP |
| 1010-66 | | | | 1041-D2-1 | 1041-D1-1 | NOP |
| 1010-67 | | | | | 1041-D2-1 | 1041-D1-1 |
| 1010-68 | | | | | | 1041-D2-1 |
| ⋮ | | | | | | |

SYSTEM AND METHOD FOR MULTI-THREADED OFDM CHANNEL EQUALIZER

FIELD OF THE INVENTION

The present disclosure relates to Orthogonal Frequency Division Multiplexing (OFDM) and Orthogonal Frequency Division Multiple Access (OFDMA).

BRIEF SUMMARY

A system for an orthogonal frequency division multiplexed (OFDM) equalizer, said OFDM equalizer comprising one or more inputs and one or more outputs, said system comprising a program memory, a program sequencer and a processing unit connected to each other, wherein the processing unit comprises an input selection unit, an arithmetic logic unit (ALU) having one or more inputs and an output, wherein said ALU is pipelined and has a plurality of pipeline stages, and an output selection unit; further wherein the program sequencer schedules the processing of one or more symbol-carrier pairs input to said OFDM equalizer using a plurality of threads, retrieves, for each of the one or more symbol-carrier pairs, a plurality of program instructions from said program memory, and generates a plurality of expanded instructions corresponding to said retrieved plurality of program instructions; and further wherein said ALU performs said processing of the one or more symbol-carrier pairs using the plurality of threads across said plurality of pipeline stages, wherein said processing comprises said ALU executing one or more arithmetic operations to process said expanded instructions using said plurality of threads across said plurality of pipeline stages, said arithmetic operations comprising addition of two or more complex numbers, multiplication of two or more complex numbers, sign change of a complex number, complex conjugation of a complex number, scaling, and division of one by the square root of a real number, further wherein said ALU executes said division of one by the square root of a real number using a lookup table.

A method of processing one or more symbol-carrier pairs in an OFDM equalizer, said OFDM equalizer comprising a program memory, a program sequencer and a processing unit connected to each other, wherein the processing unit comprises an input selection unit, an arithmetic logic unit (ALU) having one or more inputs and one output, wherein said ALU is pipelined and has a plurality of pipeline stages, and an output selection unit, said method comprising: scheduling the processing of one or more symbol-carrier pairs using a plurality of threads; retrieving, for each of the one or more symbol-carrier pairs, a plurality of program instructions from said program memory; generating a plurality of expanded instructions corresponding to said retrieved plurality of program instructions; and processing the one or more symbol-carrier pairs using the plurality of threads across said plurality of pipeline stages, said processing comprising executing one or more arithmetic operations to process said expanded instructions using said plurality of threads across said plurality of pipeline stages, said arithmetic operations comprising adding two or more complex numbers, multiplying two or more complex numbers, changing the sign of a complex number, complex conjugating of a complex number, scaling, and dividing one by the square root of a real number, said dividing performed using a lookup table.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 8 shows an example of the operation of a multi-threaded OFDM channel equalizer.

FIG. 9 shows an example of the operation of the multi-threaded OFDM channel equalizer during the transition between two consecutive symbols.

Figure 1:
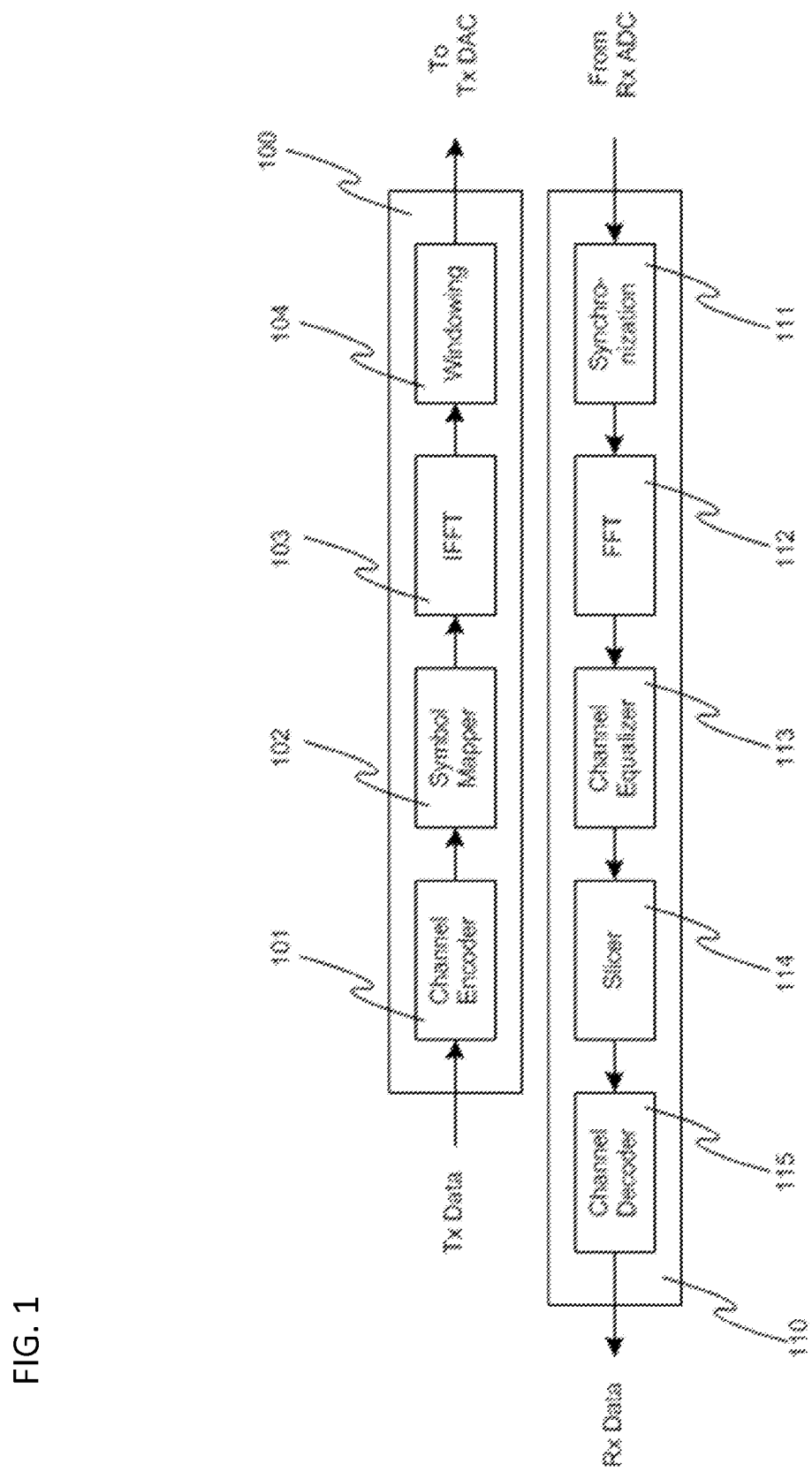
FIG. 1 shows the block diagrams of a typical OFDM or OFDMA transceiver.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

FIG. 1 shows the block diagrams of an OFDM or OFDMA transceiver composed of a transmitter 100 and a receiver 110. The transmitter 100 is composed of the channel encoder 101, the symbol mapper 102, the Inverse Fast Fourier Transform (IFFT) 103 and the windowing 104. The receiver 110 is composed of the synchronization 111, the Fast Fourier Transform (FFT) 112, the channel equalizer 113, the slicer 114 and the channel decoder 115.

In OFDM/OFDMA the signal consists of multiple orthogonal subcarriers, with different frequencies that can be modulated by different single-carrier symbols. The subcarriers are synchronized to each other so that all the single-carrier symbols start and end at the same time on all carriers, forming in time domain what is called an OFDM symbol or, a symbol.

The transmission signal is typically obtained by first applying an IFFT operation on the frequency domain representation of every symbol, then by extending the result with what is called a guard interval or a cyclic prefix (CP).

The CP is designed to be longer than the maximum expected delay spread of the channel impulse response. This is to mitigate Inter Symbol Interference (ISI) and therefore enable channel equalization for every symbol to be performed in the frequency domain through a simple multiplication.

The synchronization 111 in the receiver 110 removes the CP such that the remaining symbols are ISI free. The remaining symbols are passed through the FFT 112 and the resulting frequency domain symbols are processed by the channel equalizer 113.

With both OFDM and OFDMA, the transmission contains one or more reference symbols, for example at the beginning of the first transmission. The reference symbols are not modulated by user data but by known sequences and are used by the channel equalizer to sample the channel frequency response and compute the equalization coefficients, which are then used to equalize the remaining symbols, called data symbols. In one embodiment, the reference symbols occur also during a transmission, and the channel equalizer uses these to update the equalization coefficients. The position, number and type of reference symbols are known by the receiver. In one embodiment, this information is predefined. In another embodiment, this information is communicated between transmitter and receiver in a previous transmission.

With both OFDM and OFDMA, certain carriers within both data and reference symbols are used as pilot carriers. Pilot carriers are not modulated by user data but by known sequences and are used by the receiver to perform phase correction. In some embodiments, the number and position of the pilot carriers is the same in all symbols. In other embodiments the number and position changes from symbol to symbol according to a predefined rule. When processing a symbol, the channel equalizer processes the pilot carriers first to compute the phase correction for the current symbol, then proceeds with processing the other carriers.

Figure 2:
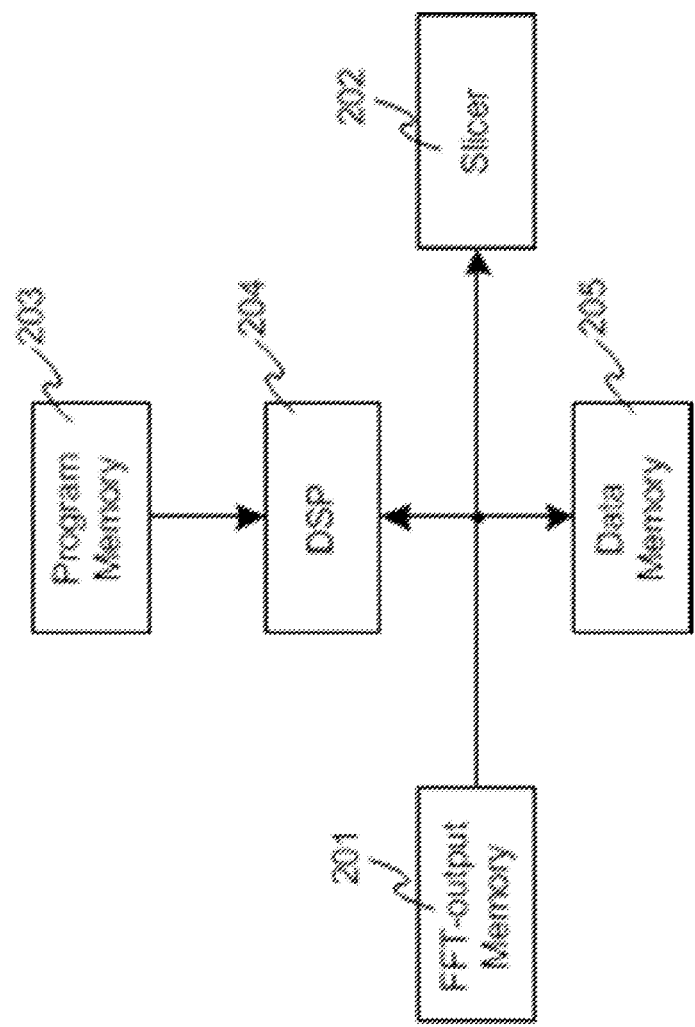
FIG. 2 shows the block diagram of a Digital Signal Processor (DSP) used in a prior art channel equalizer.
Figure 3:
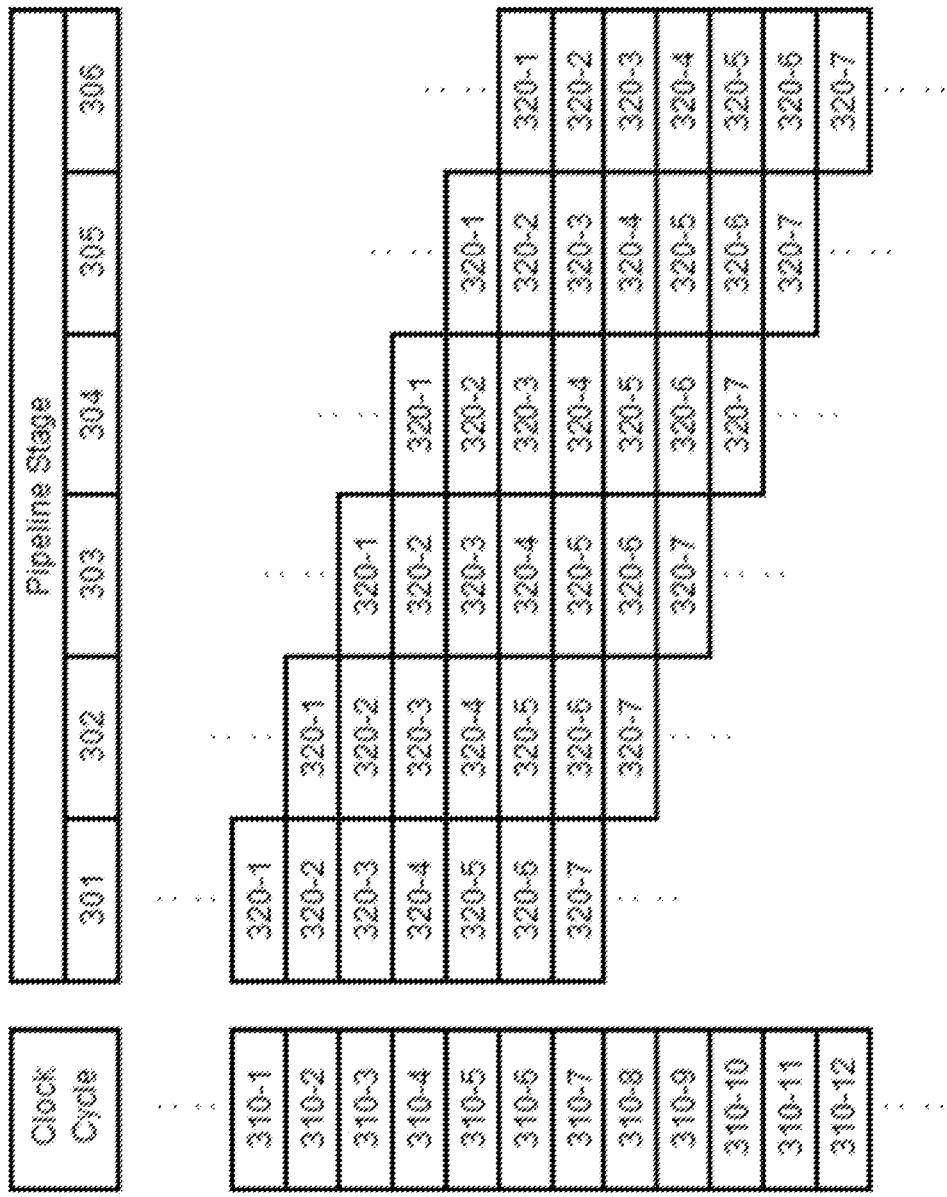
FIG. 3 shows an example of pipelined operation of a DSP with 6 stages.
Figure 4:
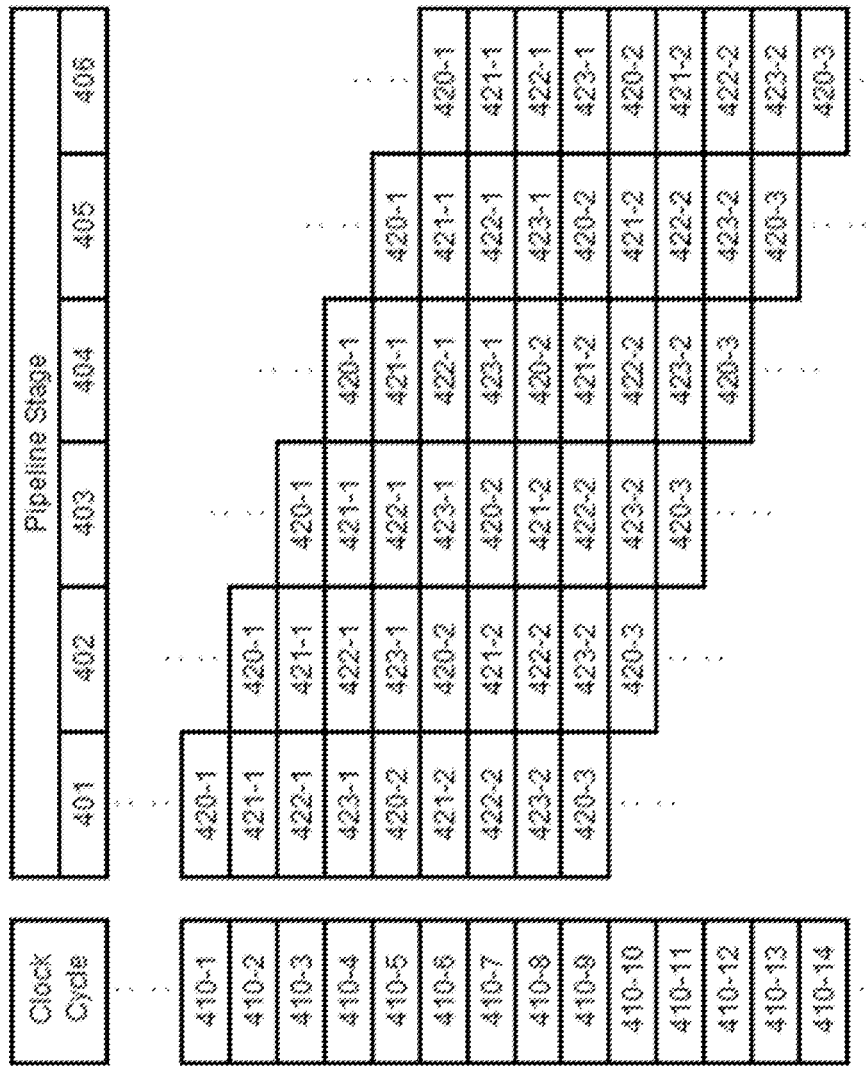
FIG. 4 shows an example of multithreaded operation of a prior art DSP operating with 4 threads.

FIGS. 2-4 show the architecture and operation of a prior art Digital Signal Processor (DSP) used to implement a prior art channel equalizer. FIG. 2 shows the block diagram of a prior art channel equalizer in which the prior art DSP 204 reads the data from the FFT-output memory 201, processes it, and writes the results to the slicer 202. The DSP runs the program from the program memory 203 and uses the data memory 205 to store temporary variables and intermediate results that do not fit within its internal registers. FIG. 2 shows an embodiment of DSP 204 that uses the Harvard architecture, in which the program and data memory spaces are separate. Therefore the program memory 203 and the data memory do not share the same bus. However the FFT-output memory 201, the data memory 205 and the slicer 202 share the same data bus and they compete for access. In one embodiment, the DSP uses a von Neumann architecture. In this embodiment the program memory 203, the FFT-output memory 201, the data memory 205 and the slicer 202 would share the same bus and compete for access.

The DSP uses a pipelined architecture to enable execution of instructions at a rate of one instruction per clock cycle. In a pipelined architecture, instruction execution is divided into instruction stages executed in consecutive clock cycles, with each instruction stage being executed by a separate hardware function so that at any given clock cycle each hardware function can execute a different instruction. As long as every instruction stage takes one clock cycle to execute, each instruction occupies the DSP for one clock cycle. For example, the pipeline stages in a DSP can be:
fetch instruction,
decode instruction,
compute operand address,
read operand,
execution stage 1,
execution stage 2, and
write result.

FIG. 3 shows an example of the operation of a DSP using pipelined architecture with six pipeline stages 301-306. The instruction 320-1 starts at clock cycle 310-1 in pipeline stage 301 and finishes at clock cycle 310-6 in pipeline stage 306 while the next instruction 320-2 does not wait for instruction 320-1 to finish and starts at clock cycle 310-2 at pipeline stage 301 and finishes at 310-7. Therefore, each instruction occupies the DSP only one clock cycle.

The DSP also includes an Arithmetic Logic Unit (ALU) which takes input operands from registers and outputs results to registers. The data is moved between the registers and the FFT-output memory 201, the data memory 205 or the slicer 202 using dedicated load/store instructions. The limited number of registers in the register set often forces the use of extra load/store instructions to load/store data from/to the data memory to/from registers. Load/store instructions are overhead as they do not perform signal processing tasks. Depending on the type of memory the load/store instructions often execute at a much lower rate than one instruction per clock cycle, therefore occupying the DSP for more than one clock cycle.

A significant part of the instructions executed by a DSP are for program control instructions like tests, jumps, subroutine calls and subroutine returns. Program control instructions are overhead as they do not perform signal processing tasks. Most program control instructions require flushing the pipeline and therefore occupy the DSP for much more than one clock cycle.

The DSP often encounters data conflicts, where the current instruction attempts to utilize the result of a previous instruction that is still executing in the pipeline. For example, in FIG. 3, the first instruction that can utilize the result from 320-1 is 320-7. If any of the instructions 320-2 to 320-6, would attempt to utilize the result of the instruction 320-1, its execution should be delayed 5, 4, 3, 2 or, respectively, 1 clock cycles to avoid errors. When data conflict is present, the execution of the current instruction is delayed until the previous instruction is completed. In such case the current instruction occupies the DSP for more than one clock cycle.

Because of the overhead caused by load/store instructions, program control instructions and data conflicts, the DSP executes the signal processing instructions at a much lower rate than one instruction per clock cycle.

Some processor architectures use multi-threading to reduce the overhead caused by data conflicts and sometimes also the overhead from load/store and program control instructions. With multi-threading, the processor executes two or more program threads in parallel by using separate registers for each program thread and by interlacing the instructions from the multiple threads in the pipeline. With multi-threading, if one thread is waiting for a load/store instruction, processing of the other threads can continue without slowing down.

FIG. 4 shows an example of the prior-art DSP operating with 4 threads. The instruction 1 of thread 420 is denoted 420-1 and starts at clock cycle 410-1 with pipeline stage 401. At the next clock cycle 410-2, the instruction 420-1 moves to pipeline stage 402, and the pipeline stage 401 executes the instruction 1 of thread 421 which is denoted 421-1. At the next clock cycle 410-2, the pipeline stage 401 executes the instruction 1 from the next thread 422 (422-1) and so on. The effect of data conflicts is significantly reduced with multithreading. For example the first instruction in thread 420 that can utilize the results from 420-1 is the instruction 420-3.

By using multi-threading, other threads can be processed while waiting for 420-1 to finish processing, therefore increasing overall processing efficiency and throughput.

However, if there are fewer threads than pipeline stages, this can lead to less than full utilization of the processor. For example, in FIG. 4, if instructions 420-2 to 423-2 needed to use the results from 420-1 to 423-1 then the DSP would have to wait until clock cycle 410-7 to insert these instructions into the pipeline stage 401. No instructions would be inserted in clock cycles 410-5 and 410-6. This would mean that the processor would be less than fully utilized.

The prior art DSP shown in FIGS. 2-4 supports real operations but not complex operations or the inverse of the square root of a number x, that is, one divided by the square root of x, denoted as 1/sqrt(x) in the remainder of the specification. This is a serious impediment to using such a prior art DSP in the implementation of a channel equalizer, as many channel equalizer algorithms require arithmetic operations like multiplications, additions, sign change, complex conjugate and scaling. In one embodiment, scaling refers to multiplying or dividing by powers of 2. Many of these operations are used to process non-pilot carriers in reference and data symbols. Also, while both inputs to and outputs from the operations can be either complex or real, complex inputs and outputs tend to dominate. The processing of pilot carriers requires all of the above operations and additionally the 1/sqrt(x) operation with real input and output. The 1/sqrt(x) operation is used to normalize the phase correction coefficient, that is, to remove the amplitude from a complex number Y by calculating Y/sqrt (Y·Y*) where Y* is the complex conjugate of Y.

To implement a single complex arithmetic operation, the prior art DSP shown in FIGS. 2-4 requires multiple instructions. A complex addition, sign change or scaling requires two similar independent instructions. A complex multiplication requires three multiplication instructions and four addition instructions. The 1/sqrt(x) is implemented using a Look Up Table (LUT) that is hosted in the external memory. This requires extra instructions to access. Implementation of the 1/sqrt(x) using an iterative algorithm is generally avoided because it will occupy a lot of clock cycles of the DSP therefore considerably slowing it down.

Because of the overhead caused by load/store instructions, program control instructions and data conflicts, the prior art DSP shown in FIGS. 2-4 executes the signal processing instructions at a much lower rate than one instruction per clock cycle. At the same time it requires multiple instructions to implement one complex arithmetic operation or 1/sqrt(x) operations.

To overcome these problems, a multi-threaded OFDM channel equalizer which is the main subject of this specification is detailed below. FIGS. 5-10 detail the architecture and operation of a multi-threaded OFDM channel equalizer which supports complex arithmetic and 1/sqrt(x) operations.

Figure 5:
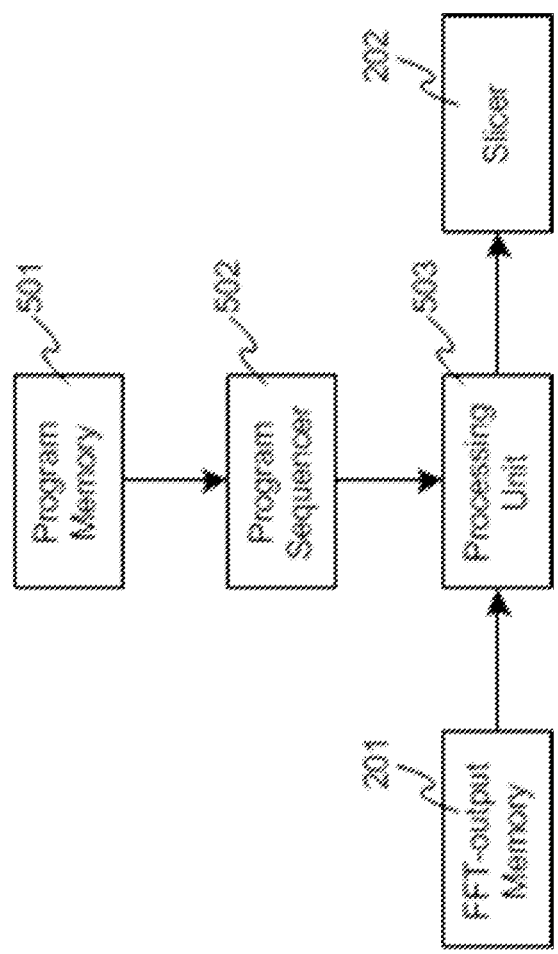
FIG. 5 shows one embodiment of the multi-threaded OFDM channel equalizer comprising the program memory 501, the program sequencer 502 and the processing unit 503.

FIG. 5 shows one embodiment of the multi-threaded OFDM channel equalizer 513 comprising the program memory 501, the program sequencer 502 and the processing unit 503. The program sequencer 502 reads the program instructions from the program memory 501 and generates expanded instructions for the processing unit 503, which reads the data from the FFT-output memory 511, processes it and writes the results to the slicer 512.

It is possible for there to be different types of pipeline-stages in the multi-threaded OFDM channel equalizer. In one embodiment, one or more of the pipeline stages are read stages. In another embodiment, there are one or more execution stages. In yet another embodiment, one or more of the pipeline stages are write stages.

The processing unit 503 is pipelined and multi-threaded. Furthermore, so as to ensure high throughput and avoid the problem of under-utilization as previously discussed with reference to FIG. 4, the number of threads in processing unit 503 either equals or exceeds the number of pipeline stages. This approach completely eliminates data conflicts within the same thread, that is, any program instruction can use the results of the previous program instruction without any delay.

The program sequencer 502 schedules the processing of each symbol-carrier pair in separate threads. Once a thread has been allocated to a symbol-carrier pair, the entire program instruction sequence required to process that symbol-carrier pair is run, before the thread is re-allocated to a new symbol-carrier pair. There are several different program instruction sequences depending on the type of symbol-carrier pair. For example, there are different program instruction sequences corresponding to:

first reference symbol,
first pilot carrier,
last pilot carrier,
all other pilot carriers,
non-pilot carrier in second reference symbol, and
data carrier in a data symbol.

All instruction sequences are stored in the program memory 501. The program sequencer 502 knows which sequence to use depending on the type of symbol and the type of carrier. Each symbol-carrier pair can be processed independently of the other symbol-carrier pairs, except for the following two cases. In the first case, processing of all pilot carriers in a symbol must be completed to obtain the phase correction for the current symbol, prior to starting processing the data carriers in the symbol. The program sequencer 502 ensures that the processing of all pilot carriers in a symbol is completed before commencing the processing of the other carriers in the symbol. The second case is that intermediate results from processing each pilot carrier must be added into a cumulative intermediate result, that is then used to compute the phase correction for the current symbol. The accumulation is therefore performed using a dedicated accumulator in the processing unit 503 that can be accessed by consecutively executed extended instructions from different threads.

The program sequencer 502 schedules the processing of symbols in their order and of carriers in a pre-determined order. Therefore neither the program sequencer 502 nor the processing unit 503 spends any clock cycle executing program control like tests, jumps, subroutine calls and subroutine returns.

For each symbol-carrier pair, there is a symbol index corresponding to the symbol and a carrier index corresponding to the carrier. Each thread also has an associated thread index.

For each symbol-carrier pair, the program sequencer 502 retrieves the program instructions from the appropriate program instruction sequence in the program memory 501 and concatenates each program instruction with the thread index, the carrier index and one or more least significant bits (LSB) of the symbol index to form the expanded instruction.

In one embodiment, the program sequencer 502 generates the expanded instructions for every pipeline stage in the processing unit 503. In another embodiment, the program sequencer 502 generates the expanded instruction for the first stage in the pipeline of the processing unit 503 and the processing unit 503 propagates the expanded instruction through necessary delays to generate expanded instructions for the other stages in its pipeline.

The address for the FFT-output memory 511 is formed by concatenating one or more LSB of the symbol index with the carrier index.

In one embodiment the output to the slicer 512 of FIG. 5 comprises a carrier index passed as an address. In another embodiment the carrier index and the symbol index are passed as an address to the slicer 512. The address can be used inside the slicer or passed to subsequent processing blocks. The address can be used to calculate the Signal to Noise Ratio (SNR) per carrier, for de-interleaving or other purposes.

Figure 6:
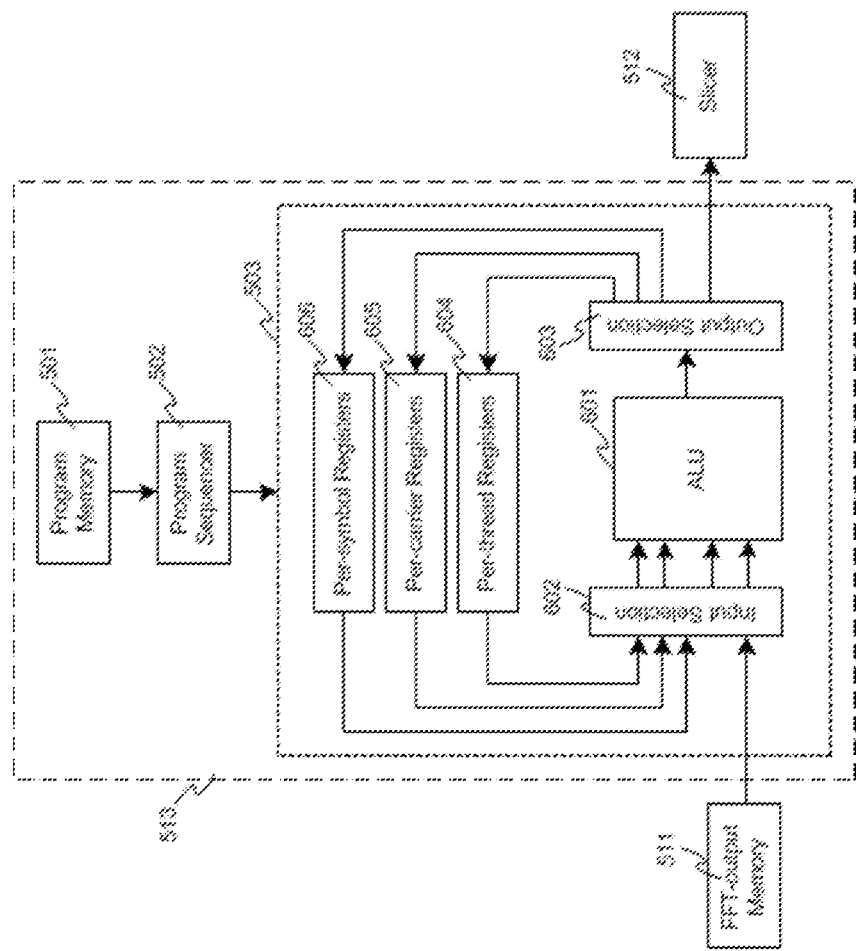
FIG. 6 shows further details of one embodiment of the multi-threaded OFDM channel equalizer.

FIG. 6 shows further details of one embodiment of the multi-threaded OFDM channel equalizer. The processing unit 503 is composed of the input selection unit 602, the Arithmetic Logic Unit (ALU) 601, the output selection unit 603 and three register banks: the per-thread register bank 604, the per-carrier register bank 605 and the per-symbol register bank 606.

The input selection unit 602 can select the source of any of the inputs to the ALU. Inputs to the ALU 601 are selected from, for example, the FFT-output memory 511 or one of the register banks 604, 605 and 606.

The ALU 601 is a collection of processing functions with, for example, 1 to 4 inputs and one output. The ALU includes a function selection multiplexer that selects which function to be applied. Examples of processing functions are multiply, multiply and accumulate, multiply and add, multiply and double add, sign and conjugate, scale and 1/sqrt(x) implemented using a Look Up Table (LUT). This is required to extract the phase correction from pilot carriers. All other processing functions have complex input and output.

The output selection unit 603 can select where the result from ALU 601 should be written to, for example, to the slicer 512, or to one of the register banks 604, 605 and 606.

The address for the registers in the per-thread register bank 604 is formed by concatenating the thread index with a register index that is part of the program instruction. This ensures that each thread uses a separate set of registers. For example, with 8 threads and 16 registers per thread there are 128 registers addressed via a 7-bit address that is obtained by concatenating the 3-bit thread index with the 4-bit register index. The thread index is generated by the program sequencer 502 while the 4-bit register index is part of the program instructions read from the program memory 501. The per-thread register bank 604 is used to store intermediate results during the processing of a symbol-carrier pair.

The address for the registers in the per-carrier register bank 605 is formed by concatenating the carrier index with the register index that is part of the program instruction. This ensures that each carrier uses a separate set of registers that is accessible to all threads. For example, with 64 carriers and 16 registers per thread there are 1024 registers addressed via a 10-bit address that is obtained by concatenating the 6-bit carrier index with the 4-bit register index. The carrier index is generated by the program sequencer 502 while the 4-bit register index is part of the program instructions read from the program memory 501. The per-carrier register bank 605 is mainly used to store equalization coefficients and the intermediate results needed to calculate them that are passed between symbols.

The address for the registers in the per-symbol register bank 606 is formed by concatenating one or more LSB of the symbol index with the register index that is part of the program instruction. This ensures that each symbol uses a separate set of registers that is accessible to all threads and all carriers. For example, to access a window of four consecutive symbols there will be enough registers to store 4 symbols. With 4 symbols to store and 8 registers per symbol, there are 32 registers addressed via a 5-bit address that is obtained by concatenating the 2-bit LSB of the symbol index with the 3-bit register index. The symbol index is generated by the program sequencer 502 while the 3-bit register index is part of the program instructions read from the program memory 501. The per-symbol register bank 606 is used to store per-symbol parameters like the phase correction coefficient.

The use of the three register banks with the three different addressing modes ensures that there is no need for the program sequencer 502 and the processing unit 503 to calculate indexed addresses that consume a lot of clock cycles in a DSP. Moreover, there is no need for the data storage outside the processing unit 503 as all operations manipulate data in these register banks.

Figure 7:
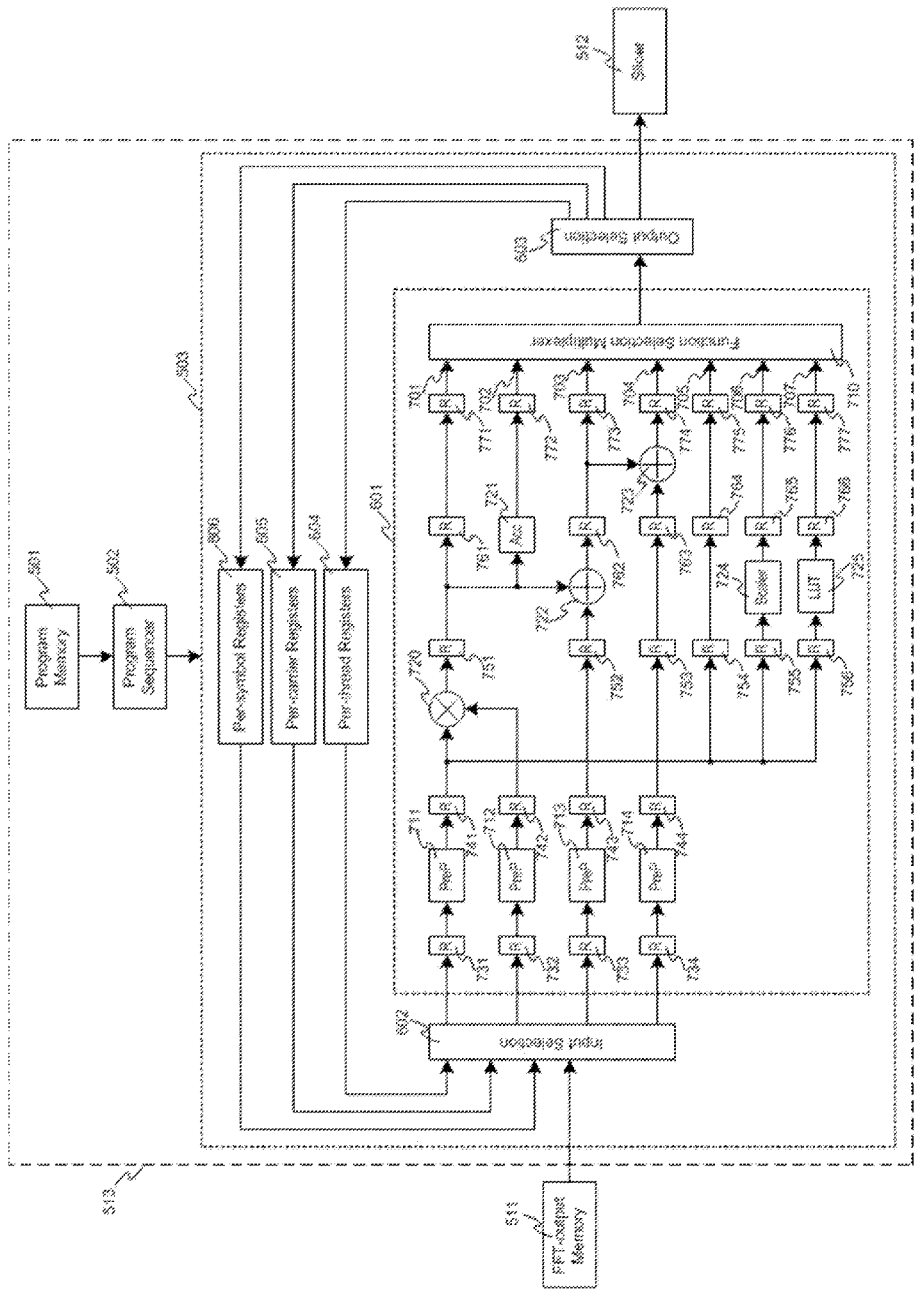
FIG. 7 shows an embodiment of ALU 601 within the multi-threaded OFDM channel equalizer.

FIG. 7 shows an embodiment of ALU 601 within the multi-threaded OFDM channel equalizer with 6 pipeline stages. The registers 731-734 store the results of the $1^{st}$ pipeline stage that reads the operands. The registers 741-744 store the results of the $2^{nd}$ pipeline stage which is the first execution stage. The registers 751-756 store the results of the $3^{rd}$ pipeline stage which is the second execution stage. The registers 761-766 and the local register within the accumulator 721 store the results of the $4^{th}$ pipeline stage which is the third execution stage. The registers 771-777 store the results of the $5^{th}$ pipeline stage which is the fourth executions stage. The sixth execution stage stores the final result of the operation in the slicer 512 or one of the register banks 604-606.

The four inputs to the ALU 601 are passed through pre-processors 711, 712, 713 and 714 in the first execution stage. In one embodiment, each pre-processor performs one or more of the following operations: negation; conjugation; zeroing the imaginary part, that is forcing the imaginary part to 0; and generating the real number 1. The operation of the pre-processors is controlled by the necessary bits in the expanded instruction. In an implementation, each pre-processor is capable of performing any of the preceding operations, even if during any given clock cycle it is actually performing only one of them.

In this embodiment the ALU 601 contains 7 processing functions represented by 7 inputs to the function selection multiplexer: 701 for multiply, 702 for multiply accumulate, 703 for multiply add, 704 for multiply double add, 705 for sign/conjugate, 706 for scale and 707 for 1/sqrt(x). The function selection multiplexer 710 selects the output of the ALU as one of the outputs of the 7 processing functions. All processing functions have complex numbers at input and output except for the 1/sqrt(x) function 707 implemented using the LUT 725 that has real numbers as input and output.

The processing functions share one or more of the same functional blocks. To obtain the multiply processing function 701, the complex multiplier 720 is applied to the outputs of the pre-processors 711 and 712. To obtain the multiply accumulate processing function 702, the accumulator 721 is applied to the output of the multiplier 720. The accumulator 721 contains a local register as explained above and can execute one of the two operations: load the local register with the output of the multiplier 720, or add the output of the multiplier 720 to the content of the local register. The operation of the accumulator 721 is controlled by one bit in the expanded instruction. The accumulator can be accessed by consecutive expanded instructions from consecutive threads allowing the pilot carriers to be processed in parallel by consecutive threads.

To obtain the multiply add processing function 703 the adder 722 is applied to the output of the multiplier 720 and the output of the pre-processor 713. To obtain the multiply double add processing function 704 the adder 723 is applied to the output of the adder 722 and the output of the pre-processor 714. To obtain the sign/conjugate processing function 705 the output of the pre-processors 711 is used.

To obtain the scale processing function 706 the scaler 724 is applied to the output of the pre-processors 711. The scaler can scale up or down, that is, multiply or divide by powers of 2, the complex number and its operation is controlled by the necessary bits in the expanded instruction. In the embodiment shown in FIG. 7 the scaler is implemented in the third execution stage. It is possible for the scaler to be implemented in any of or a combination of the second, third or fourth execution stages. For example, in one embodiment the implementation of the scaler is divided between second and third execution stage.

As explained previously, to obtain the 1/sqrt(x) processing function 707, the LUT 725 is applied to the output of the pre-processor 711. In FIG. 7 the LUT is implemented in the third execution stage but similar to the scaler it is possible to implement in any of or a combination of the second, third or fourth execution stages. For example, in one embodiment the implementation of the LUT can be divided between third and fourth execution stage.

Figure 8:
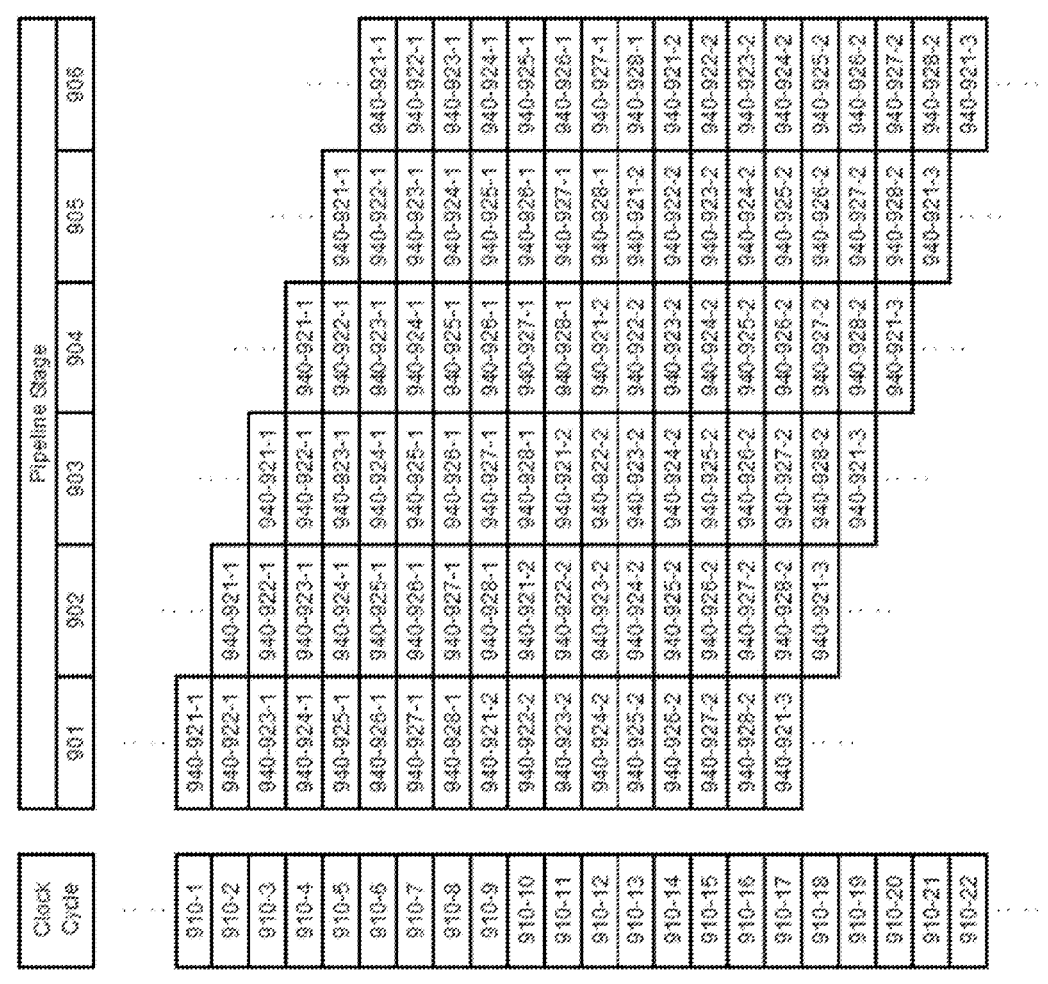

FIG. 8 shows an example of the operation of a multi-threaded OFDM channel equalizer with 8 threads and the pipeline depth of 6. The instruction 1 of the thread allocated to process carrier 921 in symbol 940 is denoted as 940-921-1 and starts at clock cycle 910-1 at pipeline stage 901. At the next clock cycle 910-2, the instruction 940-921-1 moves to pipeline stage 902, and the pipeline stage 901 executes the instruction 1 of the thread allocated to process the next carrier 922 in the same symbol 940, instruction that is denoted 940-922-1. At the next clock cycle 910-3, the pipeline stage 901 executes the instruction 940-923-1 which is the instruction 1 for the next symbol-carrier pair and so on until clock cycle 910-9 when the thread allocated to process the carrier 921 in symbol 940 returns to stage 901 to process the next instruction 940-921-2. By using a number of threads that is greater or equal to the number of pipeline stages, the multi-threaded OFDM channel equalizer avoids any data conflicts.

Figure 10:
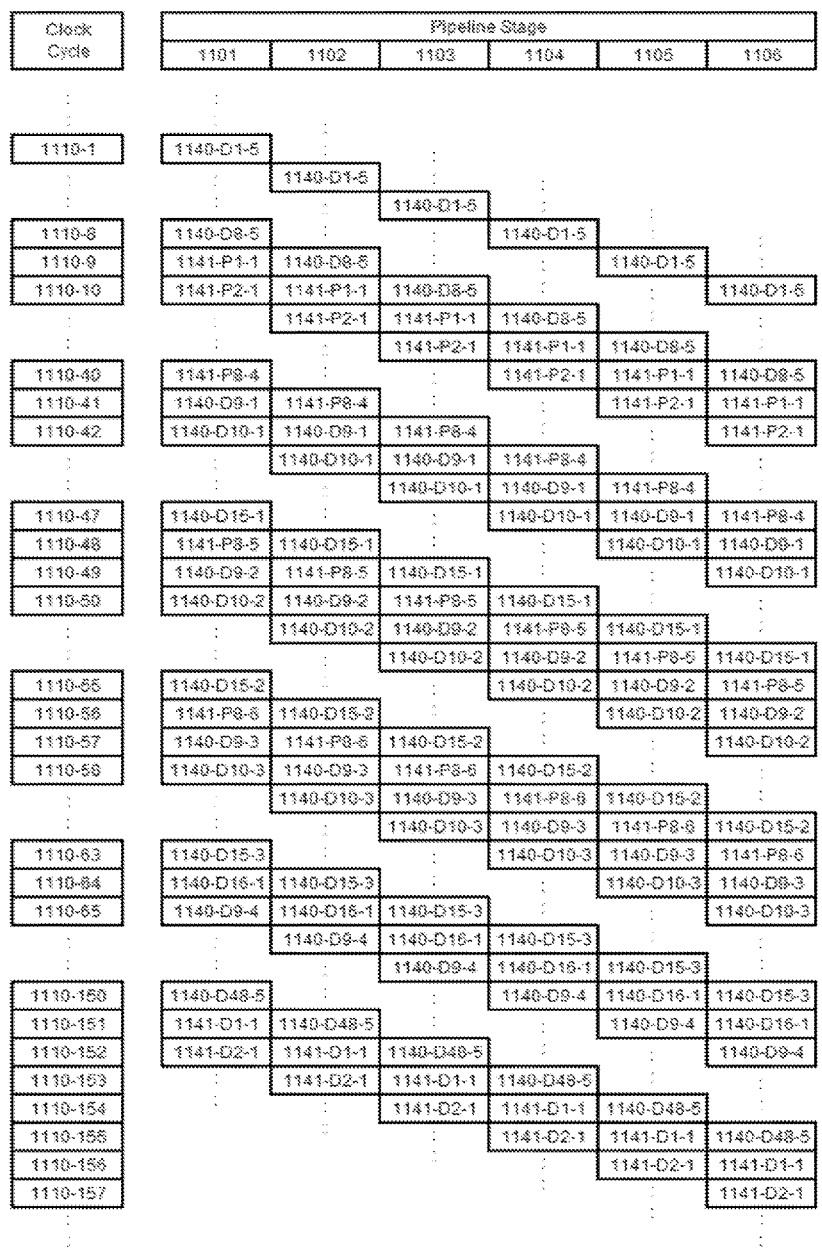
FIG. 10 shows another example of the operation of the multi-threaded OFDM channel equalizer during the transition between two consecutive symbols.

FIG. 9 shows an example of the operation of the multi-threaded OFDM channel equalizer during the transition between two consecutive symbols when the channel equalizer waits for the FFT results to be available. The example assumes a symbol containing 48 data carriers (denoted D1-D48 below) and 8 pilot carriers (denoted P1-P8 below) and also that the processing requires 5 instructions for a data carrier and 4 instructions for a pilot carrier, except for the last pilot carrier which requires 2 extra instructions to compute the phase correction. At clock cycle 1010-8 the instruction 1040-D48-5, which is the fifth and last instruction for the last data carrier 48 in symbol 1040, starts execution in pipeline stage 1001 and continues to move through the pipeline stages until finished. For the next N clock cycles the multi-threaded OFDM channel equalizer idles, that is runs NOP instructions through the pipeline until the FFT results for the next symbol 1041 become available. An example is shown in FIG. 10 for N=4. It is possible to have N=0 in case the FFT results for the next symbol are available just before 1010-9 because there is no data dependency between the two consecutive symbols. Once the FFT results become available, the multi-threaded OFDM channel equalizer processes the pilot carriers for the 8×4=32 clock cycles starting at 1010-13 with instruction 1041-P1-1, which is the first instruction for the first pilot carrier in symbol 1041, and ending at 1010-44 with instruction 1041-P8-4, which is the fourth instruction for the eighth and last pilot carrier. Then the multi-threaded OFDM channel equalizer continues to run the last two instructions for the last pilot carrier in one thread while idling (executing NOPs) on 5 other threads to avoid data conflicts. The two extra instructions take (3×6)−1=17 extra clock cycles to complete and propagate through the pipeline by clock cycle 1010-61. At clock cycle 1010-62 the phase correction is ready and the channel equalizer starts processing the first data carrier in symbol 1041.

In one embodiment, the multi-threaded OFDM channel equalizer is capable of out-of-order processing, that is: If the FFT results for the symbol-carrier pairs for the next symbol are available before the channel equalizer finishes processing the symbol-carrier pairs for the current symbol, the multi-threaded OFDM equalizer begins processing the pilot carriers for the next symbol while still processing the data carriers in the current symbol such that the transition can be achieved without any idle (or NOP) clock cycle in the channel equalizer. In one embodiment, the multi-threaded OFDM channel equalizer starts processing the pilot carriers from the next symbol as soon as threads become available and then returns to processing the data carriers in the current symbol as soon as threads are freed from the processing the pilot carriers.

FIG. 10 shows an example of the operation of the multi-threaded OFDM channel equalizer during the transition between two consecutive symbols when the FFT results for the next symbol are available early enough before the channel equalizer finishes processing the current symbol so that the transition can be achieved without any idle (or NOP) clock cycle in the channel equalizer.

The example assumes a symbol containing 48 data carriers (denoted as D1-D48 below) and 8 pilot carriers (denoted as P1-P8 below) and also that the processing requires 5 instructions for a data carrier and 4 instructions for a pilot carrier, except for the last pilot carrier which requires 2 extra instructions to compute the phase correction. At clock cycle 1110-9, one of the threads, the one that was processing data carrier D1 from symbol 1140, becomes available and, because the FFT results for the symbol 1141 are available, the thread is allocated to process pilot carrier P1 from symbol 1141. For simplicity, the example shows that the other 7 threads become available during the next 7 clock cycles and they are allocated to process the other 7 pilot carriers. However, it is not necessary that the processing of all pilot carriers starts in consecutive instructions as the threads may become free at different moments. At clock cycle 1110-41 the thread that was processing the pilot carrier P1 from symbol 1141 becomes available and is allocated to process the next data carrier D9 from symbol 1140. The same happens with the next 6 threads as they become available. The processing of the last pilot carrier from symbol 1141 continues with instruction 1141-P8-5 starting at clock cycle 1110-48 and instruction 1141-P8-6 starting at clock cycle 1110-56 in parallel with the 7 threads processing data carriers from symbol 1140. At 1110-64 the thread that was processing the last pilot carrier from symbol 1141, becomes available and it is allocated to process the next data carrier D16 from symbol 1140. By, for example, clock cycle 1110-150 all data carriers from symbol 1140 have been processed and the threads start to be allocated to process the data carriers from symbol 1141.

An ALU disclosed herein is configured to or can execute each and every arithmetic operation disclosed herein, such as addition of two or more complex numbers, multiplication of two or more complex numbers, sign change of a complex number, complex conjugation of a complex number, scaling, and division of one by the square root of a real number, but in an implementation processes only a subset (such as one) of these arithmetic operations at a time. Likewise, a pre-processor disclosed herein is configured to or can perform each and every pre-processing operation, such as negation, conjugation, generating the real number one, and zeroing the imaginary part of the complex number input, but in an implementation performs only a subset (such as one) of these preprocessing operations at a time.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for an orthogonal frequency division multiplexed (OFDM) equalizer, said OFDM equalizer comprising one or more inputs and one or more outputs, said system comprising a program memory, a program sequencer and a processing unit connected to each other, wherein:
    the processing unit comprises
        an input selection unit,
        an arithmetic logic unit (ALU) having one or more inputs and an output,
            wherein said ALU is pipelined and has a plurality of pipeline stages, and an output selection unit;
    further wherein the program sequencer
        schedules the processing of one or more symbol-carrier pairs input to said OFDM equalizer using a plurality of threads,
        retrieves, for each of the one or more symbol-carrier pairs, a plurality of program instructions from said program memory, and
        generates a plurality of expanded instructions corresponding to said retrieved plurality of program instructions; and
    further wherein
        said ALU performs said processing of the one or more symbol-carrier pairs using the plurality of threads across said plurality of pipeline stages,
            wherein said processing comprises said ALU executing one or more arithmetic operations to process said expanded instructions using said plurality of threads across said plurality of pipeline stages, said arithmetic operations comprising
            addition of two or more complex numbers,
            multiplication of two or more complex numbers,
            sign change of a complex number,
            complex conjugation of a complex number,
            scaling of a complex number, and
            division of one by the square root of a real number,
                further wherein said ALU executes said division of one by the square root of a real number using a lookup table.

2. The system of claim 1, wherein one of the one or more inputs to the OFDM equalizer is coupled to an output from a fast Fourier transform (FFT) processing system connected to an output memory of the FFT processing system, and the one or more symbol-carrier pairs are input to the OFDM equalizer from the output memory of the FFT processing system.

3. The system of claim 2, wherein
    a first subset of the one or more symbol-carrier pairs is associated with a first symbol, and a second subset of the one or more symbol-carrier pairs is associated with a second symbol;
    said first subset comprising one or more first data carriers and one or more first pilot carriers, and said second subset comprising one or more second data carriers and one or more second pilot carriers;
    wherein both the first and the second subset are stored in the output FFT memory, further wherein the first subset is stored in the output FFT memory before storing the second subset; and
    said processing unit
        commences processing of the first data carriers,
        stops processing of the first data carriers, and commences processing of the second pilot carriers when the second subset is available to be read from the output FFT memory, and
        returns to processing the first data carriers after completion of processing the second pilot carriers.

4. The system of claim 1, wherein the number of threads equals or exceeds the number of pipeline stages.

5. The system of claim 1, wherein
    the one or more symbol-carrier pairs comprise a plurality of pilot carriers,
    the ALU further includes an accumulator to allow said plurality of pilot carriers to be processed in parallel in consecutive threads.

6. The system of claim 1, wherein
    each of the one or more symbol-carrier pairs has an associated symbol index and an associated carrier index;
    each of the plurality of threads has an associated thread index; and
    said generation of expanded instructions comprises concatenation of at least the
        retrieved program instruction,
        the associated thread index,
        one or more least significant bits of the associated symbol index, and the associated carrier index.

7. The system of claim 6, wherein said processing unit comprises
    one or more per-thread register banks,
    one or more per-carrier register banks, and
    one or more per-symbol register banks.

8. The system of claim 7,
    each of the one or more per-thread register banks having an associated per-thread register bank address, said associated per-thread register bank address formed by concatenation of one or more bits in the program instruction with said associated thread index;
    each of the one or more per-carrier register banks having an associated per-carrier register bank address, said associated per-carrier register bank address formed by concatenation of one or more bits in the program instruction with said associated carrier index; and
    each of the one or more per-symbol register banks having an associated per-symbol register bank address, said associated per-symbol register bank address formed by concatenation of one or more bits in the program instruction with said one or more least significant bits from the associated symbol index.

9. The system of claim 8, wherein
    the input to the OFDM equalizer is coupled to the output of a fast Fourier transform (FFT) processing system;
    the one or more symbol-carrier pairs are input to the OFDM equalizer from an output memory of the FFT processing system; and
    the FFT output memory having one or more associated addresses, each associated address formed by concatenation of the said associated carrier index with said one or more least significant bits from the associated symbol index.

10. The system of claim 8, wherein the output from the OFDM equalizer is connected to a slicer, wherein said associated carrier index is passed to the slicer, and used by the slicer to calculate signal-to-noise ratio (SNR) for the carrier associated with the carrier index.

11. The system of claim 10, further wherein the said symbol index is passed to the slicer.

12. The system of claim 1, wherein a subset of the one or more symbol-carrier pairs is associated with a symbol;
the subset comprising one or more data carriers and one or more pilot carriers; and
wherein said program sequencer schedules processing of the one or more pilot carriers within the subset before processing the one or more data carriers within the subset.

13. The system of claim 1, wherein each input to the ALU is connected to an associated pre-processor,
each said pre-processor performs one or more pre-processing operations comprising
negation,
conjugation,
generating the real number one, and
zeroing the imaginary part of the complex number input.

14. The system of claim 1, further wherein the ALU executes a multiply-add operation.

15. The system of claim 1, further wherein the ALU executes a multiply-double-add operation.

16. A method of processing one or more symbol-carrier pairs in an OFDM equalizer, said OFDM equalizer comprising a program memory, a program sequencer and a processing unit connected to each other, wherein the processing unit comprises an input selection unit, an arithmetic logic unit (ALU) having one or more inputs and one output, wherein said ALU is pipelined and has a plurality of pipeline stages, and an output selection unit, said method comprising:
scheduling the processing of one or more symbol-carrier pairs using a plurality of threads;
retrieving, for each of the one or more symbol-carrier pairs, a plurality of program instructions from said program memory;
generating a plurality of expanded instructions corresponding to said retrieved plurality of program instructions; and
processing the one or more symbol-carrier pairs using the plurality of threads across said plurality of pipeline stages, said processing comprising
executing one or more arithmetic operations to process said expanded instructions using said plurality of threads across said plurality of pipeline stages, said arithmetic operations comprising
adding two or more complex numbers,
multiplying two or more complex numbers,
changing the sign of a complex number,
complex conjugating of a complex number,
scaling of a complex number, and
dividing one by the square root of a real number, said dividing performed using a lookup table.

17. The method of claim 16, wherein one of the one or more inputs to the OFDM equalizer is coupled to an output from a fast Fourier transform (FFT) processing system connected to an output memory of the FFT processing system, and the one or more symbol-carrier pairs are input to the OFDM equalizer from the output memory of the FFT processing system.

18. The method of claim 17, wherein
a first subset of the one or more symbol-carrier pairs is associated with a first symbol, and a second subset of the one or more symbol-carrier pairs is associated with a second symbol;
said first subset comprising one or more first data carriers and one or more first pilot carriers, and said second subset comprising one or more second data carriers and one or more second pilot carriers;
wherein both the first subset and the second subset are stored in the output FFT memory, further wherein the first subset is stored in the output FFT memory before the second subset; and
wherein said processing comprises,
commencing the processing of the first data carriers,
stopping the processing of the first data carriers, and commencing the processing of the second pilot carriers when the second subset is available to be read from the output FFT memory, and
returning to the processing of the first data carriers after completion of processing of the second pilot carriers.

19. The method of claim 16, wherein the number of threads equals or exceeds the number of pipeline stages.

20. The method of claim 16, wherein
the one or more symbol-carrier pairs comprise a plurality of pilot carriers, and
the ALU includes an accumulator to allow said plurality of pilot carriers to be processed in parallel in consecutive threads.

21. The method of claim 16, wherein
each of the one or more symbol-carrier pairs has an associated symbol index and an associated carrier index;
each of the plurality of threads has an associated thread index; and
said generating of expanded instructions comprises concatenating of the retrieved program instruction,
associated thread index,
one or more least significant bits of the associated symbol index, and
the associated carrier index.

22. The method of claim 21, wherein said processing unit comprises
one or more per-thread register banks,
one or more per-carrier register banks, and
one or more per-symbol register banks.

23. The method of claim 22,
each of the one or more per-thread register banks having an associated per-thread register bank address, said associated per-thread register bank address formed by concatenation of one or more bits in the program instruction with said associated thread index;
each of the one or more per-carrier register banks having an associated per-carrier register bank address, said associated per-carrier register bank address formed by concatenation of one or more bits in the program instruction with said associated carrier index; and
each of the one or more per-symbol register banks having an associated per-symbol register bank address, said associated per-symbol register bank address formed by concatenation of one or more bits in the program instruction with said one or more least significant bits from the associated symbol index.

24. The method of claim 23, wherein
the input to the OFDM equalizer is coupled to the output of a fast Fourier transform (FFT) processing system connected to an output memory of the FFT processing system,
the one or more symbol-carrier pairs are input to the OFDM equalizer from the output memory of the FFT processing system; and
the FFT output memory having one or more associated addresses, each associated address formed by concatenation of the said associated carrier index with said one or more least significant bits from the associated symbol index.

25. The method of claim 23, wherein one of the one or more outputs from the OFDM equalizer is connected to a slicer, wherein the said associated carrier index is passed to the slicer, and used by the slicer to calculate signal-to-noise ratio (SNR) for the carrier associated with the carrier index.

26. The method of claim 25, further wherein said symbol index is passed to the slicer.

27. The method of claim 16, wherein a subset of the one or more symbol-carrier pairs is associated with a symbol;
the subset comprising one or more data carriers, and one or more pilot carriers; and
wherein said scheduling comprises scheduling processing of the one or more pilot carriers within the subset before processing the one or more data carriers within the subset.

28. The method of claim 16, wherein each input to the ALU is connected to an associated pre-processor,
each said pre-processor performs one or more pre-processing operations comprising
negation,
conjugation,
generating the real number one, and
zeroing the imaginary part of the complex number input.

29. The method of claim 16, further wherein the ALU executes a multiply-add operation.

30. The method of claim 16, further wherein the ALU executes a multiply-double-add operation.

* * * * *